United States Patent [19]

Bauer

[11] Patent Number: 5,374,180
[45] Date of Patent: Dec. 20, 1994

[54] DEVICE FOR PRODUCING PLASTIC MOLDED SHEETS

[75] Inventor: Adolf Bauer, Olching, Germany

[73] Assignee: Krauss Maffei Aktiengesellschaft, Munich, Germany

[21] Appl. No.: 98,401

[22] PCT Filed: Nov. 27, 1992

[86] PCT No.: PCT/EP92/02734
§ 371 Date: Aug. 5, 1993
§ 102(e) Date: Aug. 5, 1993

[87] PCT Pub. No.: WO93/11921
PCT Pub. Date: Jun. 24, 1993

[30] Foreign Application Priority Data

Dec. 19, 1991 [DE] Germany .................. 4142109

[51] Int. Cl.$^5$ ........................... B29C 41/00
[52] U.S. Cl. ..................... 425/429; 264/302; 264/310; 264/319; 425/144; 425/435
[58] Field of Search ........... 264/302, 310, 311, 319, 264/327, DIG. 60; 425/144, 425, 429, 435; 249/79

[56] References Cited

U.S. PATENT DOCUMENTS 3,454,988  7/1969  Cremer .
3,502,135  3/1970  Wertli ........................ 249/79
3,565,986  2/1971  Byall ......................... 264/302
3,978,910  9/1976  Gladwin ...................... 249/79
4,072,181  2/1978  Kostura et al. .............. 425/144
4,867,660  9/1989  Nagase et al. ............... 425/435
5,032,076  7/1991  Jackson, Jr. ................ 249/79
5,106,285  4/1992  Preston ...................... 425/144
5,221,539  6/1993  Pallerberg et al. ........... 425/144

FOREIGN PATENT DOCUMENTS 0502378   9/1992  European Pat. Off. .
1600351   8/1970  France .
2181995  12/1973  France .
3417727  10/1985  Germany .

*Primary Examiner*—Charles S. Bushey
*Attorney, Agent, or Firm*—Herbert Dubno Andrew Wilford

[57] ABSTRACT

A device for producing synthetic plastic molded sheets including a mold rotatable about at least one axis and receiving a thermoplastic synthetic resin powder which is sequentially heated and cooled by liquid heating and cooling medium admitted into a hollow chamber of the mold, and a housing formed with a housing wall provided with a plurality of bulges for compensating thermal stresses resulting from different materials of the housing wall and a wall of the chamber.

4 Claims, 1 Drawing Sheet

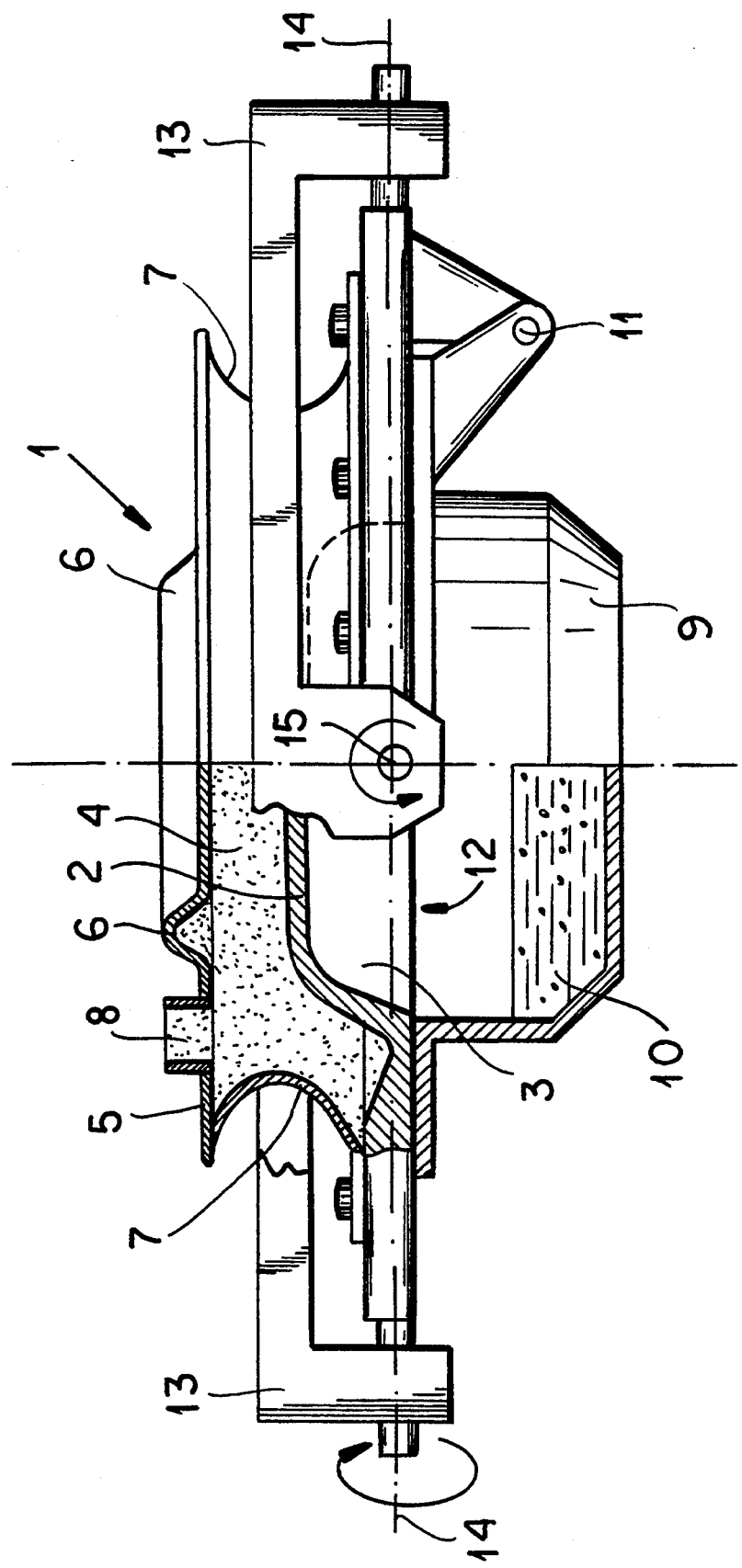

DEVICE FOR PRODUCING PLASTIC MOLDED SHEETS

CROSS REFERENCE TO RELATED APPLICATION

This a national phase application of PCT/EP 92/02734 filed Nov. 27, 1992 and based, in turn, on German application P41 42 109.4 filed Aug. 19, 1992 under the International Convention. This invention relates to a device for producing plastic molded sheets by alternatively heating and cooling mold surfaces.

BACKGROUND OF THE INVENTION

A device of this type is known from German Open Application 34 17 727, in which mold or the casting form is heated in a furnace and after reaching the operating temperature is fed to the next operating station, the changing station in which the mold is coupled with a receptacle containing a liquid thermoplastic synthetic resin.

The heating of the mold with hot circulating air requires a high energy expense and is time consuming, since apart from the quantities of air required to heat the molding, also associated holding elements must be heated. The heating with circulating air also has the drawback that residue particles from previous operating steps pass from the mold which has been cooled and from which the plastic molded sheet has been separated into the circulating air and can be deposited again on the molding surfaces of the mold.

From French Patent 1 600 351 it is also known, further, to heat a biaxially rotatable closed mold from the exterior by means of an infrared radiator so that the pulverulent plastic found in the molding is distributed uniformly over the inner surface of the mold, is there melted and, upon cooling down of the mold, can be removed as a plastic molded sheet. This type of operation also requires a high cost and is time consuming with respect to the sequence of heating and cooling.

OBJECTS OF THE INVENTION

It is therefore the object of the present invention to provide a device; with a rapid succession between heating and cooling of the mold; and another object is to provide the mold which can withstand rapidly alternating thermal expansions.

SUMMARY OF THE INVENTION

According to the invention, the device includes the walls which are comprised of nongalvanically formed material of the hollow chamber fillable with the heating and cooling medium and which have bulges for compensating the thermal expansion.

In a device for producing synthetic plastic molded sheets by means of a mold rotatable about one or more axes of rotation, in which a thermoplastic synthetic resin powder melts upon a heated mold surface in the form of a film and after cooling of the mold wall can be removed in the form of a plastic molded sheet, the heating and cooling being effected in alternating sequence by means of liquid heating and cooling medium admitted into a hollow chamber of the mold. To compensate for thermal stresses between the housing walls defining the hollow chamber and the mold wall, bulges are provided in the housing wall to compensate stresses. The thermal stresses arise primarily because of the different materials of the mold wall and the housing wall. The mold wall is comprised of a galvanic material, for example, a copper-nickel alloy, while the housing wall is comprised of normal steel sheets.

The device is also formed with a closed mold chamber and two axes of rotation.

BRIEF DESCRIPTION OF THE DRAWING

The above and other objects, features, and advantages will become more readily apparent from the following description, reference being made to the following single drawing in which the sole FIG. is a partial sectional view of the deice according to the invention.

SPECIFIC DESCRIPTION

The drawing shows a mold 1 comprised of a mold wall 2 which is composed of a material formed in a galvanic process, for example a nickel-copper alloy. According to this process, the mold surface 3 can be provided with a pitting as, for example, is customary for dashboards of an automobile.

Behind the mold wall 2 there is provided a hollow chamber 4 which is partly enclosed by the mold wall 2 and in the remainder by the housing wall 5 which is a steel sheet. The housing wall 5 which is sealingly fashioned on the mold wall 2 comprises side steel sheet walls in the form of inwardly curved bulges 7 and a bridging steel sheet wall extending between the side walls and spaced from the mold wall to form a chamber 4, said bridging steel sheet wall including bulges 6 wherein the apexes of the bulges 6 face away from the mold wall 2. The housing wall 5 further comprises a connecting fitting 8 for connection with a receptacle containing the heating and cooling media to be delivered to the chamber 4. The heating and cooling media comprise preferably oil.

The mold 1 is connected with a plastic receptacle 9 which contains the fluent thermoplastic synthetic resin powder 10. The powder receptacle 9, is for example, connected releasably with the mold 1 by means of a flap hinge 11 whereby the interior of the mold 12 can be accessible. The mold 1 is held in a support frame 13 in which it is rotatable about a first axis 14 of rotation. The support frame 13, in turn, is rotatable about a second axis 15 of rotation perpendicular to the first rotation axis 14 such that the mold 1 is biaxially rotatable.

In operation, usually the hollow chamber 4 of the mold with which the powder receptacle 9 is connected, is filled with heating medium, upon the mold 1 as rotated about the two axes 14 and 15 of rotation. As a result of this biaxial rotation, the thermoplastic synthetic resin powder is uniformly distributed over the mold surface 3 and melts to form a film thereon. Then the hollow chamber 4 is filled with the cooling medium whereupon the film layer on the mold surface 3 is solidified to a synthetic resin so that upon swinging away of the powder receptacle 9, of the mold 1, this synthetic resin sheet can be removed.

The thermal expansion which occurs in the mold 1 as a result of the alternating filling with heating and cooling medium and which also arises because of the different material characteristics of the mold wall (nickel-copper alloy) and the hollow chamber housing steel sheet is compensated by the bulges 6, 7 formed in the housing wall 5.

I claim:

1. A device for producing plastic molded sheets, the device comprising:

a closable mold cavity formed with a mold wall made of a nickel-copper alloy and having a molding surface;

means for transferring a synthetic resin into contact with said surface;

a housing provided along the mold wall and formed with:
- side steel sheet walls sealed against the mold wall, and
- a bridging steel sheet wall extending between the side walls and spaced from the mold wall, the steel sheet walls of the housing and the mold wall forming thereby a chamber therebetween;

means for alternatively filling the chamber with liquid heat medium and liquid cooling medium;

actuating means for rotating the housing and the mold cavity to cause the synthetic resin to melt on the molding surface upon delivering the heating medium into the chamber and forming a uniformly thick film of the synthetic resin upon cooling;

means for compensating different degrees of longitudinal expansion between the mold wall and the housing walls upon heating and cooling of the molding surface and including a plurality of bulges formed on the side steel sheet walls and on the steel sheet bridging wall of the housing, said bulges imparting a shape to said chamber; and means for opening the mold cavity to remove the film from the molding surface upon solidifying of the synthetic resin.

2. The device defined in claim 1 wherein the bulges formed on the side walls are curved inwardly toward one another.

3. The device defined in claim 1 wherein the mold cavity is rotatable about two mutually perpendicular axes.

4. The device defined in claim 1 wherein at least one of the bulges formed on the bridging wall of the housing is provided with an apex facing away from the mold wall.

* * * * *